(12) United States Patent
Song et al.

(10) Patent No.: US 11,874,113 B2
(45) Date of Patent: Jan. 16, 2024

(54) BIDIRECTIONAL OPTICAL-CARRYING MICROWAVE RESONANCE SYSTEM BASED ON CIRCULATOR STRUCTURE AND METHOD FOR DETECTING ANGULAR VELOCITY BY SAID SYSTEM

(71) Applicant: ZHEJIANG UNIVERSITY, Hangzhou (CN)

(72) Inventors: Kaichen Song, Hangzhou (CN); Jinlong Yu, Hangzhou (CN); Lingyun Ye, Hangzhou (CN); Ju Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 401 days.

(21) Appl. No.: 17/244,965

(22) Filed: Apr. 30, 2021

(65) Prior Publication Data

US 2022/0034660 A1 Feb. 3, 2022

Related U.S. Application Data

(63) Continuation of application No. PCT/CN2018/113213, filed on Oct. 31, 2018.

(51) Int. Cl.
*G01C 19/72* (2006.01)
*G02B 27/28* (2006.01)

(52) U.S. Cl.
CPC .......... *G01C 19/722* (2013.01); *G02B 27/283* (2013.01)

(58) Field of Classification Search
CPC .................................................. G01C 19/727
See application file for complete search history.

(56) References Cited

U.S. PATENT DOCUMENTS

2016/0116288 A1 4/2016 Song et al.

FOREIGN PATENT DOCUMENTS

CN 103267522 A 8/2013
CN 103278150 A 9/2013
(Continued)

OTHER PUBLICATIONS

International Search Report (PCT/CN2018/113213); dated Jul. 25, 2019.
Supplementary Search Report(18938457.1); dated May 19, 2022.

*Primary Examiner* — Rebecca C Bryant
(74) *Attorney, Agent, or Firm* — W&G Law Group

(57) ABSTRACT

A bidirectional optical-carrying microwave resonance system based on a circulator structure and a method for detecting angular velocity by said system. A high-stability optical-carrying microwave of which polarization states in forward and reverse directions are perpendicular is generated in an optical fiber ring by utilizing a regenerative mold locking technology, a cavity length control technology, and a polarization state separation technology, and the optical-carrying microwave is used for measuring a rotational angular velocity. The circulator structure is adopted and the bidirectional optical-carrying microwave resonance is achieved by means of a bidirectional regenerative mode locking technology. A reciprocal bidirectional optical-carrying microwave resonance system is achieved on the basis of a non-reciprocal error elimination technology of a wide-spectrum optical interferometer. The polarization state separation technology is adopted to achieve dual-wavelength separation of optical signals and the perpendicular polarization state is adopted for opposite transmission in a sensitive ring, so that the detection capability of the sensitive ring is improved. The cavity length control technology is adopted to lock a microwave oscillation frequency in one direction to a high-stability standard-time reference source, so that a relative (Continued)

cavity length of an optical resonant cavity is stabilized. The system has the characteristics of high practicability, high measurement precision and the like.

10 Claims, 3 Drawing Sheets

(56) References Cited

FOREIGN PATENT DOCUMENTS

| | | |
|---|---|---|
| CN | 104075705 A | 10/2014 |
| CN | 108344408 A | 7/2018 |
| CN | 108614126 A | 10/2018 |
| EP | 1014518 A2 | 6/2000 |

US 11,874,113 B2

BIDIRECTIONAL OPTICAL-CARRYING MICROWAVE RESONANCE SYSTEM BASED ON CIRCULATOR STRUCTURE AND METHOD FOR DETECTING ANGULAR VELOCITY BY SAID SYSTEM

TECHNICAL FIELD

The present disclosure is in the field of high precision optical gyroscope technology, and in particular relates to a bidirectional microwave-over-fiber resonant system based on a circulator structure and a method of detecting angular velocity by using the bidirectional microwave-over-fiber resonant system.

BACKGROUND

In the field of inertial navigation, accelerometers are commonly used to detect a translational velocity of a carrier and gyroscopes are commonly used to detect a rotation angular velocity of a carrier. High precision gyroscopes are mainly classified into mechanical gyroscopes and optical gyroscopes, and are widely used in various fields such as military, industry, and science. Optical gyroscopes primarily contain laser gyroscopes and fiber optic gyroscopes. Laser gyroscopes have high accuracy, but present a latching effect and have a high maintenance cost. Interferometric fiber optic gyroscopes have defects such as low optical power utilization, temperature errors, and parasitic noise, which have a low detection accuracy. Resonant fiber optic gyroscopes are easy to miniaturize, but have a high demand for light source. Thus, currently the utility thereof is to be improved. The overall stability of optical gyroscopes is still insufficient compared to mechanical gyroscopes. Their characteristics of compactness and sensitivity allow optical gyroscopes to still occupy a significant share of the market for high precision gyroscopes.

The rationale for optical gyroscopes detecting the rotation angular velocity of the carrier is Sagnac effect. The basic principle of Sagnac effect is that in a closed optical path, two light beams emitted by the same light source and transmitted in clockwise (CW) and counterclockwise (CCW) directions create different optical path differences due to carrier rotation, thereby generating a phase difference or frequency difference. Since the generated phase difference or frequency difference is only related to the rotation angular velocity of the carrier, the rotation angular velocity of the carrier can be measured by detecting the phase difference or frequency difference generated by the optical gyroscopes. To achieve Sagnac effect detection, it is first necessary to achieve the transmission of light emitted from the same light source in both clockwise (CW) and counterclockwise (CCW) directions. However, optical resonant cavity characteristics in clockwise (CW) and counterclockwise (CCW) directions cannot be exactly the same due to the limitation of the bidirectional transmission capability of the photoelectric device. Thus, the introduced non-reciprocity errors can reduce the accuracy of the microwave-over-fiber gyroscopes. Therefore, high precision and reliable optical gyroscopes remain the focus of gyroscopic research.

SUMMARY

It is an object of the disclosure to overcome shortcomings of existing angular velocity measurement solution of an optical gyroscope and to provide a bidirectional microwave-over-fiber resonant system based on a circulator structure and a method of detecting angular velocity by using the bidirectional microwave-over-fiber resonant system.

In order to achieve the above object, the present disclosure employs the following design solution. A bidirectional microwave-over-fiber resonant system based on a circulator structure includes: a broadband spectrum light source, a 50:50 coupler, a first wavelength division multiplexer, a second wavelength division multiplexer, a low speed photoelectric converter, an interferometer controller, a cavity length compensation adjuster, a first optical amplifier, a first photoelectric intensity modulator, a first optical circulator, a first optical coupler, a narrowband bidirectional optical filter, a second optical coupler, a second optical amplifier, a second photoelectric intensity modulator, a second optical circulator, a first regenerative cavity cavity-length adjuster, a first high speed photoelectric detector, a first microwave filtering and amplifying unit, a first microwave power divider, a second regenerative cavity cavity-length adjuster, a second high speed photoelectric detector, a second microwave filtering and amplifying unit, a sensing ring interferometer structure, a second microwave power divider, a third microwave power divider, and a difference frequency detection unit.

The first optical amplifier, the first photoelectric intensity modulator, the cavity length compensation adjuster, the first optical circulator, the second wavelength division multiplexer, the first optical coupler, the narrowband bidirectional optical filter, the sensing ring interferometer structure, the second optical coupler, the first wavelength division multiplexer and the second optical circulator are connected in sequence to form a clockwise ring resonant cavity. Resonant light in a clockwise direction passes sequentially through the first optical coupler, the second regenerative cavity cavity-length adjuster, the second high speed photoelectric detector, the second microwave filtering and amplifying unit, and the third microwave power divider to be fed back and modulated by the first photoelectric intensity modulator, so as to constitute a clockwise regenerative mode-locked structure. An electric signal generated by the clockwise regenerative mode-locked structure is input into the difference frequency detection unit through the third microwave power divider.

The second optical amplifier, the second photoelectric intensity modulator, the second optical circulator, the first wavelength division multiplexer, the second optical coupler, the sensing ring interferometer structure, the narrowband bidirectional optical filter, the first optical coupler, the second wavelength division multiplexer and the first optical circulator are connected in sequence to form a counterclockwise ring resonant cavity. Resonant light in a counterclockwise direction passes sequentially through the second optical coupler, the first regenerative cavity cavity-length adjuster, the first high speed photoelectric detector, the first microwave filtering and amplifying unit, the first microwave power divider, and the second microwave power divider to be fed back and modulated by the second photoelectric intensity modulator, so as to constitute a counterclockwise regenerative mode-locked structure. An electric signal generated by the counterclockwise regenerative mode-locked structure is input into the difference frequency detection unit via the second microwave power divider.

The broadband spectrum light source, the 50:50 coupler, the first wavelength division multiplexer, the second wavelength division multiplexer, the low speed photoelectric converter, the interferometer controller and the cavity length compensation adjuster constitute a reciprocity error compensation broadband spectrum optical interferometer with double loops in clockwise and counterclockwise directions.

Light emitted by the broadband spectrum light source is divided into two arms via the 50:50 coupler. A first arm passes in sequence through the second wavelength division multiplexer, the first optical circulator, the second optical amplifier, the second photoelectric intensity modulator, the second optical circulator, the first wavelength division multiplexer, the 50:50 coupler to enter the low speed photoelectric converter. A second arm passes in sequence through the first wavelength division multiplexer, a second optical circulator, a first optical amplifier, a first photoelectric intensity modulator, the cavity length compensation adjuster, the first optical circulator, the second wavelength division multiplexer, the 50:50 coupler to enter the low speed photoelectric converter. A detection signal of the low speed photoelectric converter passes through the interferometer controller and is output to control the cavity length compensation adjuster to achieve a same optical path in both arms of the broadband spectrum optical interferometer and eliminate non-reciprocal errors caused by non-bidirectional devices on both arms. The light emitted by the broadband spectrum light source does not interfere with the resonant light in the clockwise direction and the counterclockwise direction.

The sensing ring interferometer structure includes a first orthogonal polarization state adjusting unit, a polarization beam splitter, a fiber sensing ring and a second orthogonal polarization state adjusting unit.

The resonant light in the clockwise direction passes through the first orthogonal polarization state adjustment unit to adjust a double-peaked spectral signal of the narrowband bidirectional optical filter to two paths of signals with perpendicular polarization states; and the two paths of signals enter the fiber sensing ring via the polarization beam splitter, and pass through the polarization beam splitter and the second orthogonal polarization state adjustment unit to adjust the polarization states of the two paths of signals back to the initial state.

The resonant light in the counterclockwise direction passes through the second orthogonal polarization state adjustment unit to adjust the double-peaked spectral signal of the narrowband bidirectional optical filter to two paths of signals with perpendicular polarization states; and the two paths of signals enter the fiber sensing ring via the polarization beam splitter, and pass through the polarization beam splitter and the first orthogonal polarization state adjustment unit to adjust the polarization states of the two paths of signals back to the initial state.

Furthermore, in the bidirectional microwave-over-fiber resonant system based on the circulator structure, microwave signals generated by the clockwise regenerative mode-locked structure and the counterclockwise regenerative mode-locked structure are input into the difference frequency detection unit to detect an angular velocity.

Furthermore, the narrowband bidirectional optical filter changes a resonant microwave-over-fiber signal when the system is operated into a double-peaked spectral signal to achieve bidirectional dual-frequency resonance; wavelengths corresponding to spectral peaks are $\lambda_1$ and $\lambda_2$ respectively, and a frequency difference between $\lambda_1$ and $\lambda_2$ is a modulating signal $f_m$.

Furthermore, in the sensing ring interferometer structure, each of the first orthogonal polarization state adjusting unit and the second orthogonal polarization state adjusting unit includes several polarization beam splitters and polarization state controllers.

Furthermore, in the sensing ring interferometer structure, the two paths of signals with perpendicular polarization states are transmitted in opposite directions at different speeds of light in the sensing ring, to increase a detection gain of Sagnac effect of the sensing ring.

Furthermore, the first regenerative cavity cavity-length adjuster and the second regenerative cavity cavity-length adjuster act as an optical path adjusting unit, each of the first regenerative cavity cavity-length adjuster and the second regenerative cavity cavity-length adjuster adopts a fiber stretcher, a dimmable delay line or a spatial light displacement stage; and the cavity length compensation adjuster acts as a broadband spectrum interferometer arm length adjustment unit, and adopt a fiber stretcher, a dimmable light delay line or a spatial light displacement stage.

Furthermore, the system further includes a cavity length control system; the cavity length control system includes a cavity-length adjuster, a cavity length control unit and an external clock reference source; the cavity-length adjuster is disposed within a bidirectional ring resonant cavity, the first microwave power divider is input into the cavity length control unit, the external clock reference source is input into the cavity length control unit, and the cavity length control unit is connected to the cavity-length adjuster to stabilize a cavity length of the resonant cavity.

Furthermore, the cavity-length adjuster comprises a first stage cavity-length adjuster and a second stage cavity-length adjuster; the first stage cavity-length adjuster has a larger adjustment range than the second stage cavity-length adjuster; wherein the first stage cavity-length adjuster is used for slow adjustment of cavity length, the second stage cavity-length adjuster is used for fast adjustment of cavity length, and the first stage cavity-length adjuster and the second stage cavity-length adjuster are used as an optical path adjustment unit, and each of the first stage cavity-length adjuster and the second stage cavity-length adjuster adopt the fiber stretcher, the dimmable light delay line or the spatial light displacement stage.

A method for detecting an angular velocity by using the bidirectional microwave-over-fiber resonant system based on the circulator structure includes steps of:

Step 1: working light in a clockwise direction passing through the clockwise ring resonant cavity and the clockwise regenerative mode-locked structure, to obtain a stable output at a frequency f1 by the third microwave power divider;

working light in a counterclockwise direction passing through the counterclockwise ring resonant cavity and the counterclockwise regenerative mode-locked structure, to obtain a stable output at a frequency f2 by the second microwave power divider;

Step 2: generating opposite Sagnac effects in the sensing ring interferometer structure by the working light in the clockwise direction and the working light in the counterclockwise direction; and detecting a frequency difference between the frequency f1 and the frequency f2 obtained in step 1 as a beat frequency, by the frequency difference detection unit, wherein the frequency difference is recorded as $\Delta_f$;

Step 3: obtaining a rotational angular velocity $\Omega$, by a following formula:

$$\Omega_r = \frac{\lambda L}{4S} \frac{\Delta f}{G_1 + G_2},$$

where S is an area enclosed by the fiber sensing ring in the sensing ring interferometer structure, $\lambda$ is a wavelength corresponding to the frequency f1 or the frequency f2, and L is a total fiber length of the fiber sensing ring; $G_1$ is a gain generated due to sensing to the Sagnac effect of two paths with perpendicular polarization states after the working light in the clockwise direction enters the fiber sensing ring; and $G_2$ is a gain generated due to sensing to the Sagnac effect of two paths with perpendicular polarization states after the working light in the counterclockwise direction enters the fiber sensing ring.

Furthermore, when the bidirectional microwave-over-fiber resonant system based on the circulator structure has a cavity length control system, frequency discrimination and phase discrimination are performed on the microwave frequency f1 in the counterclockwise direction assigned by the first microwave power divider with an external clock reference source, and an output signal passes through a cavity length control unit to control a cavity-length adjuster for counterclockwise resonant cavity length locking; in this case, a cavity length change of the clockwise resonant cavity is a sum of a cavity length change of the clockwise resonant cavity before the cavity length locking and a cavity length change of the counterclockwise resonant cavity before the cavity length locking.

The beneficial effect of the disclosure is that bidirectional regenerative mode-locked technology is combined with conventional resonant optical gyroscopic technology to construct a bidirectional microwave-over-fiber resonant system based on a Sagnac effect principle. This system obtains instead of conventional light wave oscillations, highly stable microwave oscillations is obtained in the system by bidirectional photoelectric oscillation, which is used to measure the rotational angular velocity. The system utilizes a broadband spectrum optical interferometer to compensate for non-reciprocity errors in the clockwise and counterclockwise directions, so as to achieve reciprocity of the bidirectional structure of the microwave-over-fiber resonant system. Polarization state verticality of bidirectional transmitted signal light within the sensing ring is adjusted using the sensing ring interferometer structure. An advantage of the present disclosure is that the accuracy of difference-frequency detection of microwave signals can be much higher than a difference-frequency detection of optical signals. The former is able to detect a frequency difference by various methods such as frequency multiplication amplification, and improve the signal-to-noise ratio so that the frequency stability of microwave oscillation signals can reach $10^{-13}$. The oscillation frequencies in one direction is locked onto a more stable standard time reference source, such as an atomic clock, to stabilize the relative cavity length of the photoelectric oscillator, eliminate temperature drift and optical parasitic noise of the fiber ring cavity, and further improve frequency stability. The present disclosure greatly improves the signal-to-noise ratio of bidirectional oscillation difference-frequency signals caused by the Sagnac effect. The system and method provided herein have high utility and high measurement accuracy that can meet the requirements of high precision optical gyroscope applications.

DESCRIPTION OF EMBODIMENTS

The present disclosure will now be described in further detail with reference to the accompanying drawings and specific examples.

First Embodiment

Figure 1:
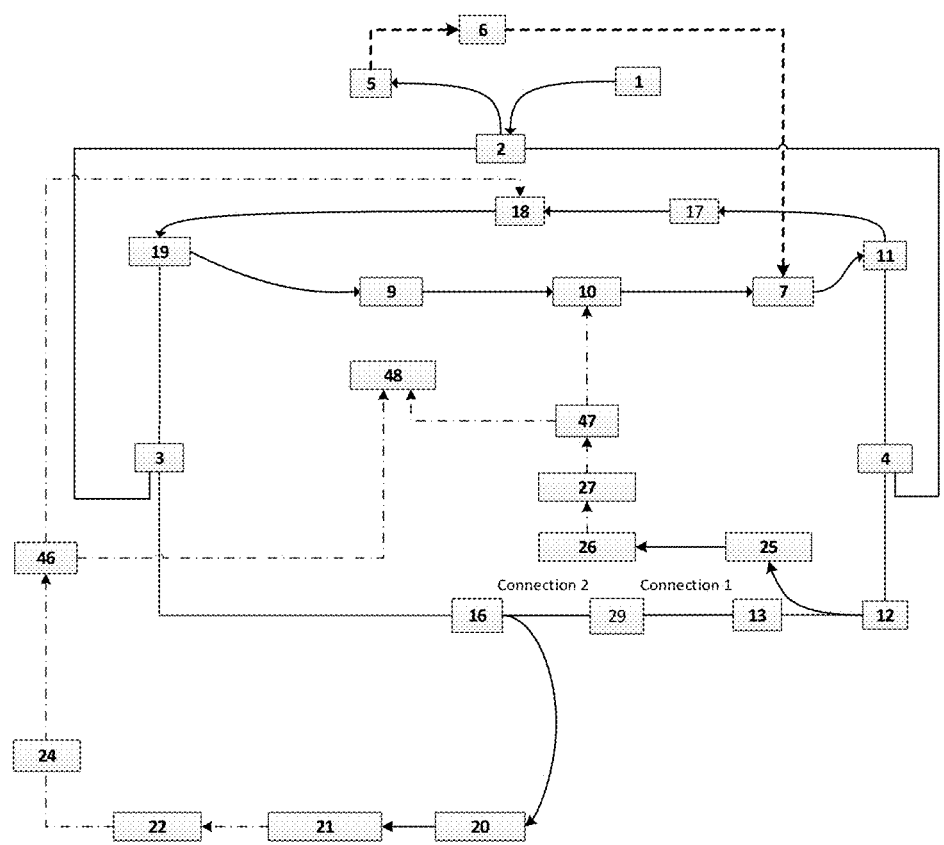
FIG. 1 is a composition block diagram of a bidirectional microwave-over-fiber resonant system based on a circulator structure in accordance with one embodiment of the present disclosure.

As shown in FIG. 1, a bidirectional microwave-over-fiber resonant system based on a circulator structure is provided according to an embodiment. The bidirectional microwave-over-fiber resonant system includes a broadband spectrum light source 1, a 50:50 coupler 2, a first wavelength division multiplexer 3, a second wavelength division multiplexer 4, a low speed photoelectric converter 5, an interferometer controller 6, a cavity length compensation adjuster 7, a first optical amplifier 9, a first photoelectric intensity modulator 10, a first optical circulator 11, a first optical coupler 12, a narrowband bidirectional optical filter 13, a second optical coupler 16, a second optical amplifier 17, a second photoelectric intensity modulator 18, a second optical circulator 19, a first regenerative cavity cavity-length adjuster a first high speed photoelectric detector 21, a first microwave filtering and amplifying unit 22, a first microwave power divider 24, a second regenerative cavity cavity-length adjuster 25, a second high speed photoelectric detector 26, a second microwave filtering and amplifying unit 27, a sensing ring interferometer structure 29, a second microwave power divider 46, a third microwave power divider 47, and a difference frequency detection unit 48.

The first optical amplifier 9, the first photoelectric intensity modulator 10, the cavity length compensation adjuster 7, the first optical circulator 11, the second wavelength division multiplexer 4, the first optical coupler 12, the narrowband bidirectional optical filter 13, the sensing ring interferometer structure 29, the second optical coupler 16, the first wavelength division multiplexer 3 and the second optical circulator 19 are connected in sequence to form a clockwise ring resonant cavity. Resonant light in a clockwise direction passes sequentially through the first optical coupler 12, the second regenerative cavity cavity-length adjuster 25, the second high speed photoelectric detector 26, the second microwave filtering and amplifying unit 27, and the third microwave power divider 47 to be fed back and modulated by the first photoelectric intensity modulator 10, so as to constitute a clockwise regenerative mode-locked structure. An electric signal generated by the clockwise regenerative mode-locked structure is input into the difference frequency detection unit 48 through the third microwave power divider 47. As an optical path adjusting unit, the second regeneration cavity cavity-length adjuster 25 can adopt a fiber stretcher, an adjustable optical delay line or a spatial optical displacement stage.

The second optical amplifier 17, the second photoelectric intensity modulator 18, the second optical circulator 19, the first wavelength division multiplexer 3, the second optical coupler 16, the sensing ring interferometer structure 29, the narrowband bidirectional optical filter 13, the first optical coupler 12, the second wavelength division multiplexer 4 and the first optical circulator 11 are connected in sequence to form a counterclockwise ring resonant cavity. Resonant light in a counterclockwise direction passes sequentially through the second optical coupler 16, the first regenerative cavity cavity-length adjuster 20, the first high speed photoelectric detector 21, the first microwave filtering and amplifying unit 22, the first microwave power divider 24, and the second microwave power divider 46 to be fed back and modulated by the second photoelectric intensity modulator 18, so as to constitute a counterclockwise regenerative mode-locked structure. An electric signal generated by the counterclockwise regenerative mode-locked structure is input into the difference frequency detection unit 48 via the second microwave power divider 46. As an optical path adjusting unit, the first regeneration cavity cavity-length adjuster 20 can adopt a fiber stretcher, an adjustable optical delay line or a spatial optical displacement stage.

The broadband spectrum light source 1, the 50:50 coupler 2, the first wavelength division multiplexer 3, the second wavelength division multiplexer 4, the low speed photoelectric converter 5, the interferometer controller 6 and the cavity length compensation adjuster 7 constitute a reciprocity error compensation broadband spectrum optical interferometer with double loops in clockwise and counterclockwise directions. The light emitted by the broadband spectrum light source 1 is divided into two arms via the 50:50 coupler 2 A first arm passes in sequence through the second wavelength division multiplexer 4, the first optical circulator 11, the second optical amplifier 17, the second photoelectric intensity modulator 18, the second optical circulator 19, the first wavelength division multiplexer 3, the 50:50 coupler 2 to enter the low speed photoelectric converter 5. A second arm sequentially passes through the first wavelength division multiplexer 3, a second optical circulator 19, a first optical amplifier 9, a first photoelectric intensity modulator 10, the cavity length compensation adjuster 7, the first optical circulator 11, the second wavelength division multiplexer 4, the 50:50 coupler 2 to enter the low speed photoelectric converter 5. A detection signal of the low speed photoelectric converter 5 passes through interferometer controller 6 and is output to control the cavity length compensation adjuster 7 to achieve the same optical path in both arms of the broadband spectrum optical interferometer and eliminate non-reciprocal errors caused by non-bidirectional devices on both arms. The light emitted by the broadband spectrum light source 1 does not interfere with the resonant light in the clockwise and counterclockwise directions. As the arm length adjusting unit of the broadband spectrum interferometer, the cavity length compensation adjuster 7 can adopt some device such as a fiber stretcher, an adjustable optical delay line or a spatial optical displacement stage.

The sensing ring interferometer structure 29 includes a first orthogonal polarization state adjusting unit 37, a polarization beam splitter 38, a fiber sensing ring 39 and a second orthogonal polarization state adjusting unit 40.

The resonant light in the clockwise direction passes through the first orthogonal polarization state adjusting unit 37 to separate the double-peak spectral signal of the narrowband bidirectional optical filter 13 into two paths of optical signals with perpendicular polarization states. The central wavelengths of the two paths of optical signals are respectively $\lambda 1$ and $\lambda 2$. The two paths of signals of $\lambda 1$ and $\lambda 2$ separated by the polarization beam splitter 38 enter the optical fiber sensing ring 39 to sense the angular velocity, and are then combined through the polarization beam splitter 38. The combined signal passes through the second orthogonal polarization state adjusting unit 40, to realize that the output signal of the sensing ring interferometer structure 29 has a consistent polarization state with the input signal thereof.

The resonant light in the counterclockwise direction passes through the second orthogonal polarization state adjusting unit 40 to separate the double-peak spectral signal of the narrowband bidirectional optical filter 13 into two paths of optical signals with perpendicular polarization states. The central wavelengths of the two paths of optical signals are respectively $\lambda 1$ and $\times 2$. The two paths of signals of $\lambda_1$ and $\lambda_2$ separated by the polarization beam splitter 38 enter the optical fiber sensing ring 39 to sense the angular velocity, and are then combined through the polarization beam splitter 38. The combined signal passes through the first orthogonal polarization state adjusting unit 37, to realize that the output signal of the sensing ring interferometer structure 29 has a consistent polarization state with the input signal.

In the bidirectional microwave-over-fiber resonant system based on the circulator structure, microwave signals generated by the clockwise regenerative mode-locked structure and the counterclockwise regenerative mode-locked structure are input into the difference frequency detection unit 48 to detect an angular velocity.

The narrowband bidirectional optical filter 13 changes a resonant microwave-over-fiber signal when the system is operated into a double-peaked spectral signal. Wavelengths corresponding to spectral peaks are $\lambda_1$ and $\lambda_2$ respectively. A frequency difference between $\lambda_1$ and $\lambda_2$ is a modulating signal $f_m$, so as to achieve bidirectional dual-frequency resonance.

In the sensing ring interferometer structure, each of the first orthogonal polarization state adjusting unit 37 and the second orthogonal polarization state adjusting unit includes several polarization beam splitters and several polarization state controllers.

In the sensing ring interferometer structure 29, two path of optical signals with perpendicular polarization states are transmitted in opposite directions at different speeds of light in the sensing ring, thereby increasing a detection gain of Sagnac effect of the sensing ring.

The signal with a wavelength of $\lambda_1$ transmitted in the counterclockwise direction into the sensing ring has the same transmission path as the signal with a wavelength of $\lambda_2$ transmitted in the clockwise direction into the sensing ring, and polarization states thereof are perpendicular. The signal with a wavelength of $\lambda_2$ transmitted in the counterclockwise direction into the sensing ring has the same transmission path as the signal with a wavelength of $\lambda_1$ transmitted in the clockwise direction into the sensing ring, and polarization states thereof are perpendicular. In this way, the wavelengths and polarization states of working optical signals in the clockwise direction and the counterclockwise direction are separated.

The optical path differences (phase differences) generated by the Sagnac effect in the clockwise and counterclockwise resonant cavities have opposite signs, resulting in that the optical path difference in clockwise and counterclockwise directions is twice the optical path difference caused by unidirectional Sagnac effect.

The method for detecting the angular velocity by using the bidirectional microwave-over-fiber resonant system based on the circulator structure includes the following steps.

Step 1: after the output light of the broadband spectrum light source 1 with an isolator passes through the 50:50 coupler for power averaging, the light is split into two paths. The first path is injected into the first wavelength division multiplexer 3, and then passes through the second optical circulator 19, the first optical amplifier 9, the first photoelectric intensity modulator 10, the cavity length compensation adjuster 7 and the first optical circulator 11 sequentially in the clockwise direction, and finally output via the second wavelength division multiplexer 4. The second path is injected into the second wavelength division multiplexer 4, and then passes through the first optical circulator 11, the second optical amplifier 17, the second photoelectric intensity modulator 18 and the second optical circulator 19 in sequence in the counterclockwise direction, and finally output via the first wavelength division multiplexer 3. The two output signals from the first wavelength division multiplexer 3 and the second wavelength division multiplexer 4 are coupled back through the same 50:50 coupler 2. The interference superposed signal is subjected to photoelectric conversion through a low speed photoelectric converter 5 and fed back through an interferometer controller 6 to adjust the cavity length compensation adjuster 7 to keep the two arms of the interferometer equal in length.

Step 2: the output light of the first optical amplifier 9 enters a common cavity in clockwise direction through the first photoelectric intensity modulator 10 and the first optical circulator 11. The light passes through the second wavelength division multiplexer 4 in the common cavity and is split into two paths by the first optical coupler 12. One path of signal further passes through the narrowband bidirectional optical filter 13, the sensing ring interferometer structure 29, the second optical coupler 16, the first wavelength division multiplexer 3 and the second optical circulator 19 and then enters the first optical amplifier 9 again to form an optical resonant cavity. The other path of signal passes through the second regenerative cavity cavity-length adjuster 25, is subjected to photoelectric conversion by the second high speed photoelectric detector 26, then enters into the second microwave filtering and amplifying unit 27 for microwave filtering and amplification, and split into two paths through the third microwave power divider 47, one path of which is injected into the first photoelectric intensity modulator 10 for microwave modulation to form a regenerative mode-locked loop, and the other path of which is used as a resonant microwave output f1 in the clockwise direction. Adjusting the second regenerative cavity cavity-length adjuster 25 prior to the second high speed photoelectric detector 26 can change the microwave phase injected into the first photoelectric intensity modulator 10 by the regenerative mode-locked loop to achieve a stable output at a frequency of f1.

Step 3: Regenerative mode-locked principle in the counterclockwise direction is similar to that in the clockwise direction. The output light of the second optical amplifier 17 enters the common cavity in the counterclockwise direction through the second photoelectric intensity modulator 18 and the second optical circulator 19; and split into two paths by the second optical coupler 16 in the common cavity. One path of signal further passes through the sensing ring interferometer structure 29, the narrowband bidirectional optical filter 13, the first optical coupler 12, the second wavelength division multiplexer 4 and the first optical circulator 11 to enter the second optical amplifier 17 again to form an optical resonant cavity. The other path of signal passes through the first regenerative cavity cavity-length adjuster 20, is subjected to photoelectric conversion by the first high speed photoelectric detector 21, then enters into the first microwave filtering and amplifying unit 22 for microwave filtering and amplification, and split into two paths through the first microwave power divider 24 and the second microwave power divider 46; one path of which is injected into the second photoelectric intensity modulator 18 for microwave modulation to form a regenerative mode-locked loop, and the other path of which is used as the resonant microwave output f2 in the counterclockwise direction. Adjusting the first regenerative cavity cavity-length adjuster prior to the first high speed photoelectric detector 21 can change the microwave phase injected into the second photoelectric intensity modulator 18 by the regenerative mode-locked loop to achieve a stable output at a frequency of f2.

Step 4: the working light in the clockwise direction and the working light in the counterclockwise direction generate opposite Sagnac effects in the sensing ring interferometer structure 29. The frequency difference detection unit 48 detects a frequency difference, i.e., a beat frequency, between the frequency f1 and the frequency f2 obtained in step 1, which is recorded as Δf.

Step 5: the rotational angular velocity Ω, is obtained by the following formula:

$$\Omega_r = \frac{\lambda L}{4S} \frac{\Delta f}{G_1 + G_2},$$

where S is an area enclosed by the fiber sensing ring in the sensing ring interferometer structure, $\lambda$, is a wavelength corresponding to the frequency f1 or the frequency f2, and L is a total fiber length of the fiber sensing ring; $G_1$ is a gain generated due to sensing to the Sagnac effect of two paths of signals with perpendicular polarization states after the working light in the clockwise direction enters the fiber sensing ring; $G_2$ is a gain generated due to sensing to the Sagnac effect of two paths of signals with perpendicular polarization states after the working light in the counterclockwise direction enters the fiber sensing ring.

Second Embodiment

Figure 2:
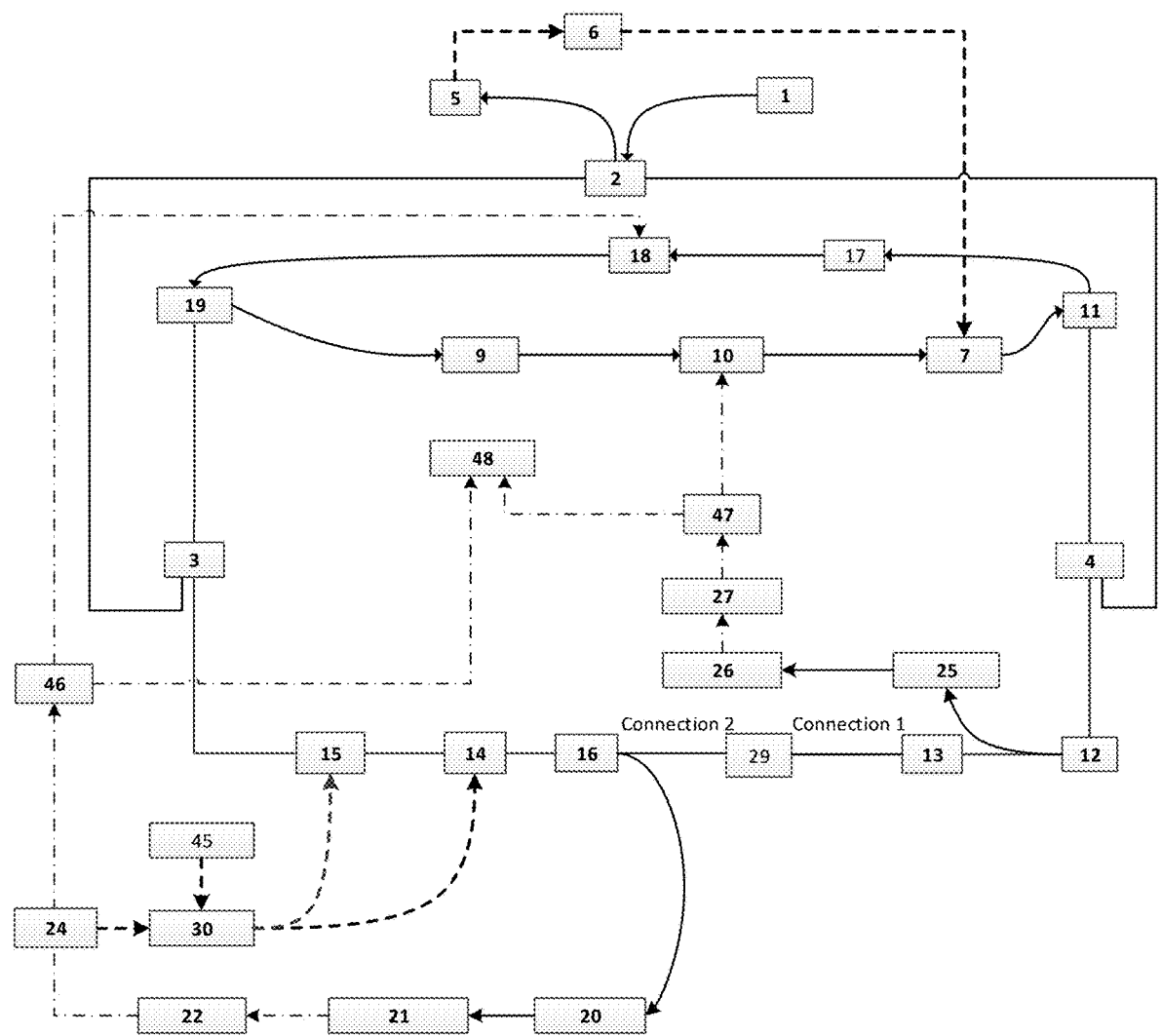
FIG. 2 is a composition block diagram of a bidirectional microwave-over-fiber resonant system based on a circulator structure in accordance with another embodiment of the present disclosure.
Figure 3:
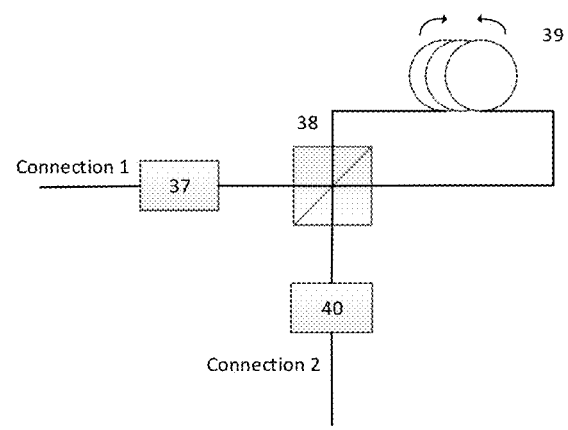
FIG. 3 is a composition block diagram of a sensing ring interferometer structure. In the figures, broadband spectrum light source 1, 50:50 coupler 2, first wavelength division multiplexer 3, second wavelength division multiplexer 4, low speed photoelectric converter 5, interferometer controller 6, cavity length compensation adjuster 7, first optical amplifier 9, first photoelectric intensity modulator 10, first optical circulator 11, first optical coupler 12, narrowband bidirectional optical filter 13, first stage cavity-length adjuster 14, second stage cavity-length adjuster 15, second optical coupler 16, second optical amplifier 17, second photoelectric intensity modulator 18, second optical circulator 19, first regenerative cavity cavity-length adjuster 20, first high speed photoelectric detector 21, first microwave filtering and amplifying unit 22, first microwave power divider 24, second regenerative cavity cavity-length adjuster 25, second high speed photoelectric detector 26, second microwave filtering and amplifying unit 27, sensing ring interferometer structure 29, cavity length control unit 30, first orthogonal polarization state adjustment unit 37, polarization beam splitter 38, fiber sensing ring 39, second orthogonal polarization state adjustment unit 40, external clock reference source 45, second microwave power divider 46, third microwave power divider 47 and difference frequency detection unit 48; the solid line parts in the figures represent light path connections, which are light paths; the dotted lines indicate microwave circuit connections, which are electrical paths.

As shown in FIG. 2, a bidirectional microwave-over-fiber resonant system based on a circulator structure is provided according to an embodiment. Based on the first embodiment, the bidirectional microwave-over-fiber resonant system further includes a cavity length control system. The cavity length control system includes a cavity length adjuster, a cavity length control unit 30 and an external clock reference source 45.

The cavity length adjuster is arranged in the bidirectional ring resonant cavity. The first microwave power divider 24 is input into the cavity length control unit 30; and the external clock reference source 18 is input into the cavity length control unit 30. The cavity length control unit 30 is connected to the cavity length adjuster to stabilize the cavity length of the resonant cavity.

Further, the cavity length adjuster includes a first stage cavity length adjuster 14 and a second stage cavity length adjuster 15. The first stage cavity length adjuster 14 has a larger adjustment range than the second stage cavity length adjuster 15. The first stage cavity length adjuster 14 is used for slow adjustment of the cavity length, and the second stage cavity length adjuster 15 is used for fast adjustment of the cavity length. The first stage cavity length adjuster 14 and the second stage cavity length adjuster 15 are used as an optical path adjustment unit, which may employ a fiber stretcher, a dimmable delay line, or a spatial light displacement stage.

Frequency discrimination and phase discrimination are performed on the microwave frequency f1 in the clockwise direction assigned by the second microwave power divider 24 with the external clock reference source 45. An output signal passes through the cavity length control unit 30 to control a cavity length regulator for a cavity length locking of the clockwise resonant cavity. In this case, a resonant cavity length change in the clockwise direction is a sum of a resonant cavity length change in the clockwise direction before the cavity length locking and a resonant cavity length change in the counterclockwise direction before the cavity length locking.

Those skilled in the art will readily be able to make numerous variations and modifications from the written description, the drawings, and the claims provided herein without departing from the spirit and scope of the disclosure as defined in the claims. Any modifications and equivalent variations made to the above-described embodiments according to the technical idea and essence of the present disclosure fall within the scope of protection defined in the claims of the present disclosure.

What is claimed is:

1. A bidirectional microwave-over-fiber resonant system based on a circulator structure, comprising a broadband spectrum light source (1), a 50:50 coupler (2), a first wavelength division multiplexer (3), a second wavelength division multiplexer (4), a low speed photoelectric converter (5), an interferometer controller (6), a cavity length compensation adjuster (7), a first optical amplifier (9), a first photoelectric intensity modulator (10), a first optical circulator (11), a first optical coupler (12), a narrowband bidirectional optical filter (13), a second optical coupler (16), a second optical amplifier (17), a second photoelectric intensity modulator (18), a second optical circulator (19), a first regenerative cavity cavity-length adjuster (20), a first high speed photoelectric detector (21), a first microwave filtering and amplifying unit (22), a first microwave power divider (24), a second regenerative cavity cavity-length adjuster (25), a second high speed photoelectric detector (26), a second microwave filtering and amplifying unit (27), a sensing ring interferometer structure (29), a second microwave power divider (46), a third microwave power divider (47), and a difference frequency detection unit (48);

wherein the first optical amplifier (9), the first photoelectric intensity modulator (10), the cavity length compensation adjuster (7), the first optical circulator (11), the second wavelength division multiplexer (4), the first optical coupler (12), the narrowband bidirectional optical filter (13), the sensing ring interferometer structure (29), the second optical coupler (16), the first wavelength division multiplexer (3) and the second optical circulator (19) are connected in sequence to form a clockwise ring resonant cavity; resonant light in a clockwise direction passes sequentially through the first optical coupler (12), the second regenerative cavity cavity-length adjuster (25), the second high speed photoelectric detector (26), the second microwave filtering and amplifying unit (27), and the third microwave power divider (47) to be fed back and modulated by the first photoelectric intensity modulator (10), so as to constitute a clockwise regenerative mode-locked structure; an electric signal generated by the clockwise regenerative mode-locked structure is input into the difference frequency detection unit (48) through the third microwave power divider (47);

wherein the second optical amplifier (17), the second photoelectric intensity modulator (18), the second optical circulator (19), the first wavelength division multiplexer (3), the second optical coupler (16), the sensing ring interferometer structure (29), the narrowband bidirectional optical filter (13), the first optical coupler (12), the second wavelength division multiplexer (4) and the first optical circulator (11) are connected in sequence to form a counterclockwise ring resonant cavity; resonant light in a counterclockwise direction passes sequentially through the second optical coupler (16), the first regenerative cavity cavity-length adjuster (20), the first high speed photoelectric detector (21), the first microwave filtering and amplifying unit (22), the first microwave power divider (24), and the second microwave power divider (46) to be fed back and modulated by the second photoelectric intensity modulator (18), so as to constitute a counterclockwise regenerative mode-locked structure; an electric signal generated by the counterclockwise regenerative mode-locked structure is input into the difference frequency detection unit (48) via the second microwave power divider (46);

wherein the broadband spectrum light source (1), the 50:50 coupler (2), the first wavelength division multiplexer (3), the second wavelength division multiplexer (4), the low speed photoelectric converter (5), the interferometer controller (6) and the cavity length compensation adjuster (7) constitute a reciprocity error compensation broadband spectrum optical interferometer with double loops in clockwise and counterclockwise directions; light emitted by the broadband spectrum light source (1) is divided into two arms via the 50:50 coupler (2), wherein a first arm passes in sequence through the second wavelength division multiplexer (4), the first optical circulator (11), the second optical amplifier (17), the second photoelectric intensity modulator (18), the second optical circulator (19), the first wavelength division multiplexer (3), the 50:50 coupler (2) to enter the low speed photoelectric converter (5); a second arm passes in sequence through the first wavelength division multiplexer (3), a second optical circulator (19), a first optical amplifier (9), a first photoelectric intensity modulator (10), the cavity length compensation adjuster (7), the first optical circulator (11), the second wavelength division multiplexer (4), the 50:50 coupler (2) to enter the low speed photoelectric converter (5); a detection signal of the low speed photoelectric converter (5) passes through the interferometer controller (6) and is output to control the cavity length compensation adjuster (7) to achieve a same optical path in both arms of the broadband spectrum optical interferometer and eliminate non-reciprocal errors caused by non-bidirectional devices on both arms; the light emitted by the broadband spectrum light source (1) does not interfere with the resonant light in the clockwise direction and the counterclockwise direction;

the sensing ring interferometer structure (29) comprises a first orthogonal polarization state adjusting unit (37), a polarization beam splitter (38), a fiber sensing ring (39) and a second orthogonal polarization state adjusting unit (40);

the resonant light in the clockwise direction passes through the first orthogonal polarization state adjustment unit (37) to adjust a double-peaked spectral signal of the narrowband bidirectional optical filter (13) to two paths of signals with perpendicular polarization states; and the two paths of signals enter the fiber sensing ring (39) via the polarization beam splitter (38), and pass through the polarization beam splitter (38) and the second orthogonal polarization state adjustment unit (40) to adjust the polarization states back to an initial state;

the resonant light in the counterclockwise direction passes through the second orthogonal polarization state adjustment unit (40) to adjust the double-peaked spectral signal of the narrowband bidirectional optical filter (13) to two paths of signals with perpendicular polarization states; and the two paths of signals enter the fiber sensing ring (39) via the polarization beam splitter (38), and pass through the polarization beam splitter (38) and the first orthogonal polarization state adjustment unit (37) to adjust the polarization states back to an initial state.

2. The bidirectional microwave-over-fiber resonant system based on the circulator structure according to claim 1, wherein microwave signals generated by the clockwise regenerative mode-locked structure and the counterclockwise regenerative mode-locked structure are input into the difference frequency detection unit (48) to detect an angular velocity.

3. The bidirectional microwave-over-fiber resonant system based on the circulator structure according to claim 1, wherein the narrowband bidirectional optical filter (13) changes a resonant microwave-over-fiber signal when the system is operated into a double-peaked spectral signal to achieve bidirectional dual-frequency resonance; wavelengths corresponding to spectral peaks are $\lambda_1$ and $\lambda_2$ respectively, and a frequency difference between $\lambda_1$ and $\lambda_2$ is a modulating signal $f_m$.

4. The bidirectional microwave-over-fiber resonant system based on the circulator structure according to claim 1, wherein in the sensing ring interferometer structure (29), each of the first orthogonal polarization state adjusting unit (37) and the second orthogonal polarization state adjusting unit (40) comprises a plurality of polarization beam splitters and a plurality of polarization state controllers.

5. The bidirectional microwave-over-fiber resonant system based on the circulator structure according to claim 1, wherein in the sensing ring interferometer structure (29), two paths of signals with perpendicular polarization states are transmitted in opposite directions at different speeds of light in a sensing ring, to increase a detection gain of Sagnac effect of the sensing ring.

6. The bidirectional microwave-over-fiber resonant system based on the circulator structure according to claim 1, wherein the first regenerative cavity cavity-length adjuster (20) and the second regenerative cavity cavity-length adjuster (25) act as an optical path adjusting unit; and each of the first regenerative cavity cavity-length adjuster (20) and the second regenerative cavity cavity-length adjuster (25) adopts a fiber stretcher, a dimmable delay line or a spatial light displacement stage; and the cavity length compensation adjuster (7) acts as a broadband spectrum interferometer arm length adjustment unit, and adopt a fiber stretcher, a dimmable light delay line or a spatial light displacement stage.

7. The bidirectional microwave-over-fiber resonant system based on the circulator structure according to claim 1, further comprising a cavity length control system; wherein the cavity length control system comprises a cavity-length adjuster, a cavity length control unit (30) and an external clock reference source (45); the cavity-length adjuster is disposed within a bidirectional ring resonant cavity, the first microwave power divider (24) is input into the cavity length control unit (30), the external clock reference source (45) is input into the cavity length control unit (30), and the cavity length control unit (30) is connected to the cavity-length adjuster to stabilize a cavity length of the resonant cavity.

8. The bidirectional microwave-over-fiber resonant system based on the circulator structure according to claim 1, wherein the cavity-length adjuster comprises a first stage cavity-length adjuster (14) and a second stage cavity-length adjuster (15); the first stage cavity-length adjuster (14) has a larger adjustment range than the second stage cavity-length adjuster (15); wherein the first stage cavity-length adjuster (14) is used for slow adjustment of cavity length, and the second stage cavity-length adjuster (15) is used for fast adjustment of cavity length; and the first stage cavity-length adjuster (14) and the second stage cavity-length adjuster (15) are used as an optical path adjustment unit, and each of the first stage cavity-length adjuster (14) and the second stage cavity-length adjuster (15) adopt a fiber stretcher, a dimmable light delay line or a spatial light displacement stage.

9. A method for detecting an angular velocity by using the bidirectional microwave-over-fiber resonant system based on the circulator structure according to claim 1, comprising steps of:

Step 1: working light in the clockwise direction passing through the clockwise ring resonant cavity and the clockwise regenerative mode-locked structure, so as to obtain a stable output at a frequency f1 by the third microwave power divider (47);

working light in the counterclockwise direction passing through the counterclockwise ring resonant cavity and the counterclockwise regenerative mode-locked structure, so as to obtain a stable output at a frequency f2 by the second microwave power divider (46);

Step 2: generating opposite Sagnac effects in the sensing ring interferometer structure (29) by the working light in the clockwise direction and the working light in the counterclockwise direction, and detecting a frequency difference between the frequency f1 and the frequency f2 obtained in step 1 as a beat frequency, by the frequency difference detection unit (48), wherein the frequency difference is recorded as Δf;

Step 3: obtaining a rotational angular velocity $\Omega_r$ by a following formula:

$$\Omega_r = \frac{\lambda L}{4S} \frac{\Delta f}{G_1 + G_2},$$

wherein S is an area enclosed by the fiber sensing ring in the sensing ring interferometer structure, λ is a wavelength corresponding to the frequency f1 or the frequency f2, and L is a total fiber length of the fiber sensing ring; $G_1$ is a gain generated due to sensing to the Sagnac effect of two paths with perpendicular polarization states after the working light in the clockwise direction enters the fiber sensing ring; and $G_2$ is a gain generated due to sensing to the Sagnac effect of two paths with perpendicular polarization states after the working light in the counterclockwise direction enters the fiber sensing ring.

10. The method according to claim 9, wherein when the bidirectional microwave-over-fiber resonant system based on the circulator structure has a cavity length control system, frequency discrimination and phase discrimination are performed on the microwave frequency f1 in the counterclockwise direction assigned by the first microwave power divider (24) with an external clock reference source (45), and an output signal passes through a cavity length control unit (30) to control a cavity-length adjuster for counterclockwise resonant cavity length locking; and a cavity length change of the clockwise resonant cavity is a sum of a cavity length change of the clockwise resonant cavity before the cavity length locking and a cavity length change of the counterclockwise resonant cavity before the cavity length locking.

* * * * *